United States Patent
Rohrer et al.

(10) Patent No.: US 7,570,887 B2
(45) Date of Patent: Aug. 4, 2009

(54) OPTICAL NETWORK INTERFACE SYSTEMS AND DEVICES

(75) Inventors: Thomas J. Rohrer, Jasper, GA (US); Michael Gregory Abernathy, Ellijay, GA (US); Wilber Andrew Williams, Acworth, GA (US); Jean Wu, Norcross, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 760 days.

(21) Appl. No.: 10/493,855

(22) PCT Filed: Mar. 25, 2004

(86) PCT No.: PCT/US2004/009157

§ 371 (c)(1), (2), (4) Date: Apr. 28, 2004

(87) PCT Pub. No.: WO2004/093351

PCT Pub. Date: Oct. 28, 2004

(65) Prior Publication Data

US 2005/0213973 A1   Sep. 29, 2005

Related U.S. Application Data

(60) Provisional application No. 60/459,347, filed on Mar. 31, 2003.

(51) Int. Cl.
*H04J 14/00* (2006.01)

(52) U.S. Cl. .......................................... 398/73; 398/60

(58) Field of Classification Search ............ 398/58–61, 398/66–69, 73, 82–85; 385/24, 27, 31
See application file for complete search history.

(56) References Cited

U.S. PATENT DOCUMENTS

| 3,883,217 A | 5/1975 | Love et al. |
| 3,887,876 A | 6/1975 | Zeidler |
| 3,936,141 A | 2/1976 | Milton |
| 3,943,358 A | 3/1976 | Reymond et al. |

FOREIGN PATENT DOCUMENTS

DE   3007958 A1   3/1984

(Continued)

OTHER PUBLICATIONS

Personick, Stewart D., *Optical Fiber Transmission Systems*, 1981, pp. 1-3.

(Continued)

*Primary Examiner*—Nathan M Curs
(74) *Attorney, Agent, or Firm*—Kilpatrick Stockton LLP

(57) ABSTRACT

Optical network interface systems and devices are described. In one embodiment of the present invention, an optical transport system comprises an optical bus capable of transmitting data signals, a plurality of optical bus interface modules connected to the optical bus, wherein each optical bus interface module is capable of inputting data signals on the optical bus and outputting data signals from the optical bus, a plurality of electronic devices, and a plurality of electro-optical network interfaces, wherein each electro-optical network interface is associated with a single electronic device and is contained in a single structure, wherein each electro-optical interface is capable of receiving data signals from an associated optical bus interface module and passing the data signals to the associated electronic device according to a variety of suitable protocols such as Ethernet, FiberChannel, and Infiniband, and each electro-optical interface is capable of receiving data signals from the associated electronic device and passing the data signals to the associated optical bus interface module according to a variety of suitable protocols such as Ethernet, FiberChannel, and Infiniband.

5 Claims, 9 Drawing Sheets

U.S. PATENT DOCUMENTS

| | | |
|---|---|---|
| 4,054,366 A | 10/1977 | Barnoski et al. |
| 4,166,946 A | 9/1979 | Chown et al. |
| 4,234,969 A | 11/1980 | Singh |
| 4,249,266 A | 2/1981 | Nakamori |
| 4,301,543 A | 11/1981 | Palmer |
| 4,307,933 A | 12/1981 | Palmer et al. |
| 4,317,614 A | 3/1982 | Palmer |
| 4,366,565 A | 12/1982 | Herskowitz |
| 4,367,460 A | 1/1983 | Hodara |
| 4,400,054 A | 8/1983 | Biard et al. |
| 4,423,922 A | 1/1984 | Porter |
| 4,435,849 A | 3/1984 | Ilgner et al. |
| 4,446,515 A | 5/1984 | Sauer et al. |
| 4,457,581 A | 7/1984 | Johnson et al. |
| 4,482,980 A | 11/1984 | Korowitz et al. |
| 4,506,153 A | 3/1985 | Ohno |
| 4,543,574 A | 9/1985 | Takagi et al. |
| 4,545,074 A | 10/1985 | Balliet et al. |
| 4,554,511 A | 11/1985 | Braun |
| 4,577,184 A | 3/1986 | Hodara et al. |
| 4,595,839 A | 6/1986 | Braun et al. |
| 4,630,256 A | 12/1986 | Albanese |
| 4,654,890 A | 3/1987 | Hasegawa et al. |
| 4,671,608 A | 6/1987 | Konishi |
| 4,674,830 A | 6/1987 | Shaw et al. |
| 4,705,350 A | 11/1987 | Cheng |
| 4,715,012 A | 12/1987 | Mueller, Jr. |
| 4,717,229 A | 1/1988 | Cutler |
| 4,731,784 A | 3/1988 | Keller et al. |
| 4,739,183 A | 4/1988 | Tokura et al. |
| 4,756,595 A | 7/1988 | Braun et al. |
| 4,759,011 A | 7/1988 | Hicks, Jr. |
| 4,761,833 A | 8/1988 | Epworth |
| 4,786,130 A | 11/1988 | Georgiou et al. |
| 4,810,052 A | 3/1989 | Fling |
| 4,829,593 A | 5/1989 | Hara |
| 4,845,483 A | 7/1989 | Negishi |
| 4,850,047 A | 7/1989 | Iguchi et al. |
| 4,883,335 A | 11/1989 | Alferness et al. |
| 4,885,589 A | 12/1989 | Edward et al. |
| 4,898,565 A | 2/1990 | Braun |
| 4,932,004 A | 6/1990 | Hodara et al. |
| 4,946,244 A | 8/1990 | Schembri |
| 4,947,134 A | 8/1990 | Olsson |
| 4,948,218 A | 8/1990 | Kobayashi et al. |
| 4,958,354 A | 9/1990 | Urakami et al. |
| 4,959,837 A | 9/1990 | Febrier et al. |
| 5,029,306 A | 7/1991 | Bull et al. |
| 5,046,137 A | 9/1991 | Kurobe et al. |
| 5,055,827 A | 10/1991 | Philipp |
| 5,058,101 A | 10/1991 | Albanese et al. |
| 5,058,974 A | 10/1991 | Mollenauer |
| 5,080,505 A | 1/1992 | Epworth |
| 5,083,874 A | 1/1992 | Aida et al. |
| 5,117,196 A | 5/1992 | Epworth et al. |
| 5,117,303 A | 5/1992 | Desurvire et al. |
| 5,129,019 A | 7/1992 | Robberg et al. |
| 5,133,031 A | 7/1992 | Tanaka et al. |
| 5,179,603 A | 1/1993 | Hall et al. |
| 5,181,134 A | 1/1993 | Fatehi et al. |
| 5,185,735 A | 2/1993 | Ernst |
| 5,187,605 A | 2/1993 | Shikata et al. |
| 5,189,541 A | 2/1993 | Konishi |
| 5,212,577 A | 5/1993 | Nakamura et al. |
| 5,222,166 A | 6/1993 | Weltha |
| 5,267,071 A | 11/1993 | Little et al. |
| 5,283,687 A | 2/1994 | Hsu et al. |
| 5,296,957 A | 3/1994 | Takahashi et al. |
| 5,307,197 A | 4/1994 | Tanabe et al. |
| 5,309,564 A | 5/1994 | Bradley et al. |
| 5,315,424 A | 5/1994 | Boden et al. |
| 5,317,580 A | 5/1994 | Auffret et al. |
| 5,319,642 A | 6/1994 | Ota |
| 5,345,230 A | 9/1994 | Jackson et al. |
| 5,347,384 A | 9/1994 | McReynolds et al. |
| 5,361,262 A | 11/1994 | Cheung |
| 5,363,367 A | 11/1994 | Kobayashi et al. |
| 5,369,516 A | 11/1994 | Uchida |
| 5,392,154 A | 2/1995 | Lin et al. |
| 5,412,746 A | 5/1995 | Rossberg et al. |
| 5,414,416 A | 5/1995 | Yamakita et al. |
| 5,424,864 A | 6/1995 | Emura |
| 5,432,874 A | 7/1995 | Muraguchi |
| 5,434,861 A | 7/1995 | Pritty et al. |
| 5,471,342 A | 11/1995 | Junginger et al. |
| 5,479,082 A | 12/1995 | Calvani et al. |
| 5,481,478 A | 1/1996 | Palmieri et al. |
| 5,483,233 A | 1/1996 | Pettitt et al. |
| 5,500,857 A | 3/1996 | Nakata |
| 5,500,867 A | 3/1996 | Krasulick |
| 5,502,589 A | 3/1996 | Yamamoto et al. |
| 5,506,709 A | 4/1996 | Segal et al. |
| 5,508,689 A | 4/1996 | Rado et al. |
| 5,517,622 A | 5/1996 | Ivanoff et al. |
| 5,528,408 A | 6/1996 | McGinley |
| 5,533,153 A | 7/1996 | Ota |
| 5,539,558 A | 7/1996 | Yonemura et al. |
| 5,541,957 A | 7/1996 | Lau |
| 5,548,431 A | 8/1996 | Shin et al. |
| 5,552,921 A | 9/1996 | Hetzel et al. |
| 5,572,612 A | 11/1996 | Delavaux et al. |
| 5,615,290 A | 3/1997 | Harasawa et al. |
| 5,623,169 A | 4/1997 | Sugimoto et al. |
| 5,664,035 A | 9/1997 | Tsuji et al. |
| 5,684,899 A | 11/1997 | Ota |
| 5,712,932 A | 1/1998 | Alexander et al. |
| 5,712,937 A | 1/1998 | Asawa et al. |
| 5,717,795 A | 2/1998 | Sharma et al. |
| 5,732,086 A | 3/1998 | Liang et al. |
| 5,739,938 A | 4/1998 | Goutzoulis et al. |
| 5,745,479 A | 4/1998 | Burns et al. |
| 5,764,821 A | 6/1998 | Glance |
| 5,777,561 A | 7/1998 | Chieu et al. |
| 5,778,118 A | 7/1998 | Sridhar |
| 5,793,908 A | 8/1998 | Mizuochi et al. |
| 5,796,890 A | 8/1998 | Tsuji et al. |
| 5,801,865 A | 9/1998 | Weis et al. |
| 5,809,187 A | 9/1998 | Peck, Jr. et al. |
| 5,815,294 A | 9/1998 | Ishikawa et al. |
| 5,825,515 A | 10/1998 | Anderson |
| 5,825,949 A | 10/1998 | Choy et al. |
| 5,838,989 A | 11/1998 | Hutchison et al. |
| 5,854,698 A | 12/1998 | Eskildsen et al. |
| 5,866,898 A | 2/1999 | Hodgson et al. |
| 5,880,863 A | 3/1999 | Rideout et al. |
| 5,894,362 A | 4/1999 | Onaka et al. |
| 5,896,417 A | 4/1999 | Lau |
| 5,898,673 A | 4/1999 | Riggan et al. |
| 5,898,801 A * | 4/1999 | Braun et al. .................. 385/24 |
| 5,901,260 A * | 5/1999 | Braun ........................ 385/24 |
| 5,910,851 A | 6/1999 | Flaherty |
| 5,937,032 A | 8/1999 | Nummelin et al. |
| 5,943,148 A | 8/1999 | Hamel et al. |
| 5,949,560 A | 9/1999 | Roberts et al. |
| 5,959,412 A | 9/1999 | Ushijimi |
| 5,995,258 A | 11/1999 | Weber et al. |
| 6,008,915 A | 12/1999 | Zyskind |
| 6,014,481 A | 1/2000 | Kremers |
| 6,075,628 A | 6/2000 | Fisher et al. |
| 6,075,648 A | 6/2000 | Yamamoto et al. |
| 6,084,233 A | 7/2000 | Hodgson et al. |
| 6,111,888 A | 8/2000 | Green et al. |
| 6,122,095 A | 9/2000 | Fatchi |
| 6,128,111 A | 10/2000 | Roberts |

| | | | |
|---|---|---|---|
| 6,140,920 A | 10/2000 | Roberts | |
| 6,157,725 A | 12/2000 | Becker | |
| 6,175,533 B1 | 1/2001 | Lee et al. | |
| 6,345,137 B1 | 2/2002 | Imajo | |
| 6,385,366 B1 | 5/2002 | Lin | |
| 6,426,815 B1 | 7/2002 | Koehler | |
| 6,449,072 B1 | 9/2002 | Sian et al. | |
| 6,499,027 B1 | 12/2002 | Weinberger | |
| 6,502,131 B1 | 12/2002 | Vaid et al. | |
| 6,567,197 B1 | 5/2003 | Glance | |
| 6,782,422 B1 | 8/2004 | Bahl et al. | |
| 6,784,837 B2 | 8/2004 | Revankar et al. | |
| 6,830,221 B1 | 12/2004 | Janson et al. | |
| 6,912,339 B2 | 6/2005 | Whittaker | |
| 7,133,416 B1* | 11/2006 | Chamdani et al. | 370/466 |
| 2002/0018260 A1 | 2/2002 | Kisovec et al. | |
| 2002/0032780 A1 | 3/2002 | Moore et al. | |
| 2002/0044565 A1 | 4/2002 | Park | |
| 2002/0065962 A1* | 5/2002 | Bakke et al. | 710/38 |
| 2002/0067893 A1 | 6/2002 | Uken | |
| 2002/0083169 A1 | 6/2002 | Aki et al. | |
| 2002/0101636 A1 | 8/2002 | Xiao et al. | |
| 2002/0101874 A1 | 8/2002 | Whittaker et al. | |
| 2003/0025967 A1* | 2/2003 | Tai | 359/127 |
| 2003/0176196 A1 | 9/2003 | Hall et al. | |
| 2003/0204789 A1 | 10/2003 | Peebles et al. | |
| 2003/0206134 A1 | 11/2003 | Lier et al. | |
| 2004/0043795 A1 | 3/2004 | Zancewicz | |
| 2004/0076429 A1* | 4/2004 | Meroth et al. | 398/19 |
| 2004/0076434 A1* | 4/2004 | Whittaker et al. | 398/69 |
| 2004/0208578 A1* | 10/2004 | Kinoshita et al. | 398/83 |

FOREIGN PATENT DOCUMENTS

| | | |
|---|---|---|
| DE | 3807072 A1 | 8/1988 |
| DE | 3938856 A1 | 11/1989 |
| DE | 41 02 459 A1 | 7/1992 |
| DE | 4331330 A1 | 9/1993 |
| DE | 42 26 838 A1 | 2/1994 |
| DE | 4226838 | 2/1994 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 211 221 A1 | 2/1987 |
| EP | 0 231 635 A2 | 8/1987 |
| EP | 0 356 090 A2 | 2/1990 |
| EP | 0 380 341 A2 | 8/1990 |
| EP | 0 393 293 | 10/1990 |
| EP | 0 414 333 | 2/1991 |
| EP | 0 905 936 A2 | 3/1991 |
| EP | 0 451 426 | 10/1991 |
| EP | 0 503 212 | 9/1992 |
| EP | 0 528 636 A1 | 2/1993 |
| EP | 0 739 103 A2 | 10/1996 |
| EP | 0 744 797 A1 | 11/1996 |
| EP | 0 899 161 A1 | 3/1999 |
| EP | 0 350 720 | 1/2001 |
| EP | 1 246 378 A2 | 10/2002 |
| EP | 1 260 840 A2 | 11/2002 |
| FR | 2574565 | 6/1986 |
| GB | 2073877 | 10/1981 |
| GB | 2087679 | 5/1982 |
| GB | 2102232 | 1/1983 |
| GB | 2 118 319 A1 | 10/1983 |
| GB | 2189961 | 11/1987 |
| GB | 2255683 | 11/1992 |
| JP | 11-87823 | 7/1989 |
| JP | 7-202921 | 8/1995 |
| JP | 09/51322 | 2/1997 |
| JP | 9-321739 | 12/1997 |
| JP | 10-107773 | 4/1998 |
| JP | 11-331224 | 3/1999 |
| WO | WO 93/03406 | 2/1993 |
| WO | WO 00/57582 | 9/2000 |

OTHER PUBLICATIONS

H. Hodara, and E. Miles, "*High-Speed Local Area Networks*", *Fiber and Integrated Optics*; (1992) pp. 253-277.

N.A. Olsson, *Lightwave Systems With Optical Amplifiers, Journal of Lightwave Technology*, Jul. 1989, pp. 1071-1082 (Jul. 1989).

ITU-T Recommendation G.681, Series G: Transmission Systems and Media, Digital Systems and Networks; Functional characteristics of interoffice and long-haul systems using optical amplifiers, including optical multiplexing (Oct. 1996).

ITU-T Recommendation G.692, Series G: Transmission Systems and Media, Digital Systems and Networks; Optical interfaces for multichannel systems with optical amplifiers (Oct. 1998).

Fibre Channel—Overview of the Technology, Sep. 9, 2000, pp. 1-9 *available at* http://fibrechannel.org/technology.

Bi-Directional Optical Backplane Bus for Board to Board Optoelectronic Interconnects, Gicheri Kim, Jinghuai Fa and Ray T. Chen, 1-4 (Sep. 9, 2000) *available at* http://ece.utexas.edu/projects/ece/mrc/profs/chen_projects/optbus/optbus.html.

SOME Bus (Simultaneous Optical Multiprocessor Exchange Bus)(Sep. 9, 2000) *available at* http://eb.uah.edu/-cohen/some_bus/some_bus.html.

0034-P PCI 1-Gig Fibre Channel Optical Host Bus Adapter 1-4 *available at* http://solutions.sun.com/dbsearch/index.cgi?STATE=product&CMD=show&p_id=58181 (Sep. 9, 2000).

Architectural and Engineering Issues for Building an Optical Internet 1—55 (Sep. 9, 2000) *available at* http://www.canet3.net/papers/ArchandEngIssues.html.

Chinlon Lin, *Systems Applications of WDM Technologies in Optical Communications*, SPIE-International Society for Optical Engineering (Aug. 15-18, 1994).

Manuel Lopez-Amo, Loudon T Blair & Paul Urquhart, *Wavelength-Division-Multiplexed distributed optical fiber amplifier bus network for data and sensors*, Optics Letter 1159-61(Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140-km 20-Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master," United Technologies Research Center, UTRC Technical Report RR-9500470 (Jun. 1995).

Technical Report CSRI-298 entitled "A New Binary Logarithmic Arbitration Method for Ethernet," by Mart L. Molle of Computer Systems Research Institute, pp. 1-57 (Apr. 1994).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.

Yamashita, et al., "Studies of a system gathering multi-channel visual signals using a single optical fiber and a bi-directional optical amplifier," *T.IEE Japan*, 119-C(12):1528-1534 (1999).

Kempainen, "Optical Networking lightens carrier-backbone burden," *EDN*, pp. 63, 64, 65, 66, 68, 70, 72 (Oct. 8, 1998).

Thomas, et al., "Physics in the Whirlwind of Optical Communications," *Physics Today*, pp. 30-36 (Sep. 2000).

Press Release entitled "Lucent Technologies announces record-breaking 320-channel optical networking system," (pp. 1-2) (Apr. 17, 2000).

Iannone, et al., "A 160-km transparent metro WDM ring network featuring cascaded erbium-doped waveguide amplifiers," published by Optical Society of America (2000).

"Performance Management—Management of SONET Networks—White Paper," Clear Communications, *Sonet and Performance Management*, Issue 1, Apr. 1996 (pp. 1-21).

Cisco Wavelength Router Manager—Data Sheet, www.cisco.com/warp/public/cc/so/neso/olso/cwrm_ds.htm (Apr. 25, 2001).

Keyserling, A. and R.C.L., "Chapter 2: Number, Dimensions, Manderlbrot, Chaos, 4 Attractors, Music and Color," www.chanceandchoice.com/ChanceandChoice/chapter2.html.

Gallardo, et al., "Fast Simulation of Broadband Telecommunications Networks Carrying Long-Range Dependent Bursty Traffic," Preceedings of the 1999 Winder Simulation Conference, pp. 374-381 (Winter 1999).

Willinger, et al., "Self-Similarity Through High-Variability: Statistical Analysis of Ethernet LAN Traffic at the Source Level," pp. 1-31 (Apr. 15, 1997).

DeCotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

Liew, "A Broad-Band Optical Network Based on Hierarchical Multiplexing of Wavelengths and RF Subcarariers," *Journal of Lightwave Technology*, 7(11):1825-1838 (1989).

Al-Raweshidy and Komaki, *Radio Over Fiber Technologies* (2002).

Fibre Channel Overview http://his.web.cern.ch/HIS/fcs/spec/overview.htm, pp. 1-10 (Nov. 5, 2002).

Ethernet FAST Ethernet Fiber Optic Media Converters, http://www.versitron.com/Ethernet.html, 2 pages (Nov. 5, 2002).

HomeNetHelp.com, http://www.homenethelp.com/web/explain.about-hubs-and-switches.asp, 5 pages (Nov. 5, 2002).

Fibre Channel, http://www.iol.unh.edu/training/fc/fc_tutorial.html, 22 pages (Nov. 5, 2002).

Paper authored by Stewart, William L. and James G. Blaylock, Lockheed Martin Aeronautics Company, entitled 'The Challenge of Transmitting Super-High Frequency Radio Signals Over Short-Fiber-Optic Networks on Aerospace Platforms,', pp. 1-9 (Oct. 2002).

Stewart, William L., Senior Staff Specialist, and James Blaylock, Senior Staff Specialist, Lockheed Martin Aeronautics Company, presentation entitled 'The Challenge of Transmitting Super-High Frequency Radio Signals Over Short-Fiber-Optic Networks on Aerospace Platforms,', 21st DASC : Oct. 31, 2002pp. 1-9 (Oct. 2002), 14 pages.

* cited by examiner

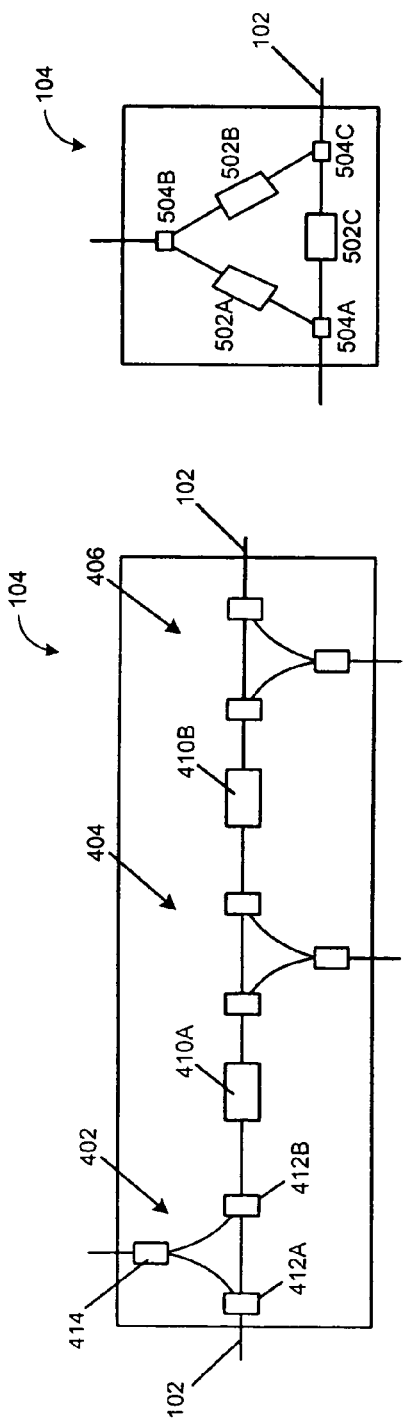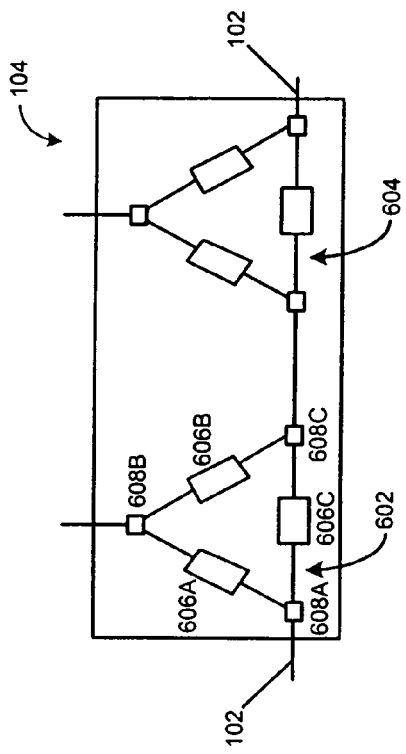

OPTICAL NETWORK INTERFACE SYSTEMS AND DEVICES

CROSS-REFERENCE TO RELATED APPLICATION

This application claims priority to U.S. Provisional Patent Application Ser. No. 60/459,347 filed Mar. 31, 2003 entitled "Optical Network Interface Card," which is hereby incorporated in its entirety by this reference.

FIELD OF THE INVENTION

The invention relates generally to an optical distribution network and, more particularly, to systems and devices for interfacing with an optical network.

BACKGROUND

A large number of computer networks use Ethernet protocols to distribute data. A computer network configured to conform to Ethernet protocols generally utilizes full duplex links between nodes in the network requiring a point to point connection scheme with a dedicated transmission and reception port at each node. These protocols, connection scheme and transport media are commonly known as 10BASET, 100BASET, 1000BASETX, SX, LX, Gigabit Ethernet and so forth. Conventional Ethernet networks typically use un-shielded twisted pairs (UTP) or dual fiber cables to connect a transmit port of one device to a receive port of another and visa-a-versa. With such a point to point scheme, the introduction of hubs, switches, and routers are generally needed to handle the interconnection of multiple devices. Conventional Ethernet networks are limited by the switching and throughput ability of these distribution devices.

Optical networks allow for faster distribution of data. Wavelength division multiplexing (WDM) can be used in optical networks to transmit many signals simultaneously over a single fiber by encoding them in different wavelengths or channels. U.S. Pat. No. 5,898,801, which is hereby incorporated in its entirety by this reference, discloses a bi-directional optical transport system that permits a plurality of different network topologies and utilizes WDM. U.S. Pat. No. 5,901,260, which is hereby incorporated in its entirety by this reference, discloses an optical bus interface module (OBIM) that operates as a passive fiber optic coupler, which can be combined with WDM and selectively routes optical signals in and out of the optical network at each node. This OBIM is capable of inserting, extracting, and transmitting light bi-directionally over one, two or a plurality of fiber optic transmission lines carrying one, two or a plurality of analog, digital, or discrete signals that are encoded using one, two, or a plurality of encoding techniques. The WDM optical system and devices described by U.S. Pat. No. 5,898,801 and U.S. Pat. No. 5,901,260 currently utilize a point-to-point connection when using Ethernet network protocols, which does not maximize the configuration of the WDM optical system.

SUMMARY

Embodiments of the present invention provide optical network interface systems and devices. In one embodiment of the present invention an optical transport system comprises an optical bus capable of transmitting data signals, a plurality of optical bus interface modules connected to the optical bus, wherein each optical bus interface module is capable of inputting data signals on the optical bus and outputting data signals from the optical bus, a plurality of electronic devices, and a plurality of electro-optical network interfaces, wherein each electro-optical network interface is associated with a single electronic device and is contained in a single structure, wherein each electro-optical interface is capable of receiving data signals from an associated optical bus interface module and passing the data signals to the associated electronic device according to a variety of suitable protocols such as, for example, Ethernet, FiberChannel, and Infiniband and each electro-optical interface is capable of receiving data signals from the associated electronic device and passing the data signals to the associated optical bus interface module according to a variety of suitable protocols such as, for example, Ethernet, FiberChannel, and Infiniband.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF DRAWINGS

These and other features, aspects, and advantages of the present invention are better understood when the following detailed description is read with reference to the accompanying drawings, wherein:

FIG. 4 is a diagram illustrating an alternative embodiment for an OBIM according to one embodiment of the present invention;

FIG. 5 is a diagram illustrating an alternative embodiment of an OBIM according to one embodiment of the present invention;

FIG. 6 is a diagram illustrating an alternative embodiment of an OBIM according to one embodiment of the present invention;

DETAILED DESCRIPTION

Figure 1:
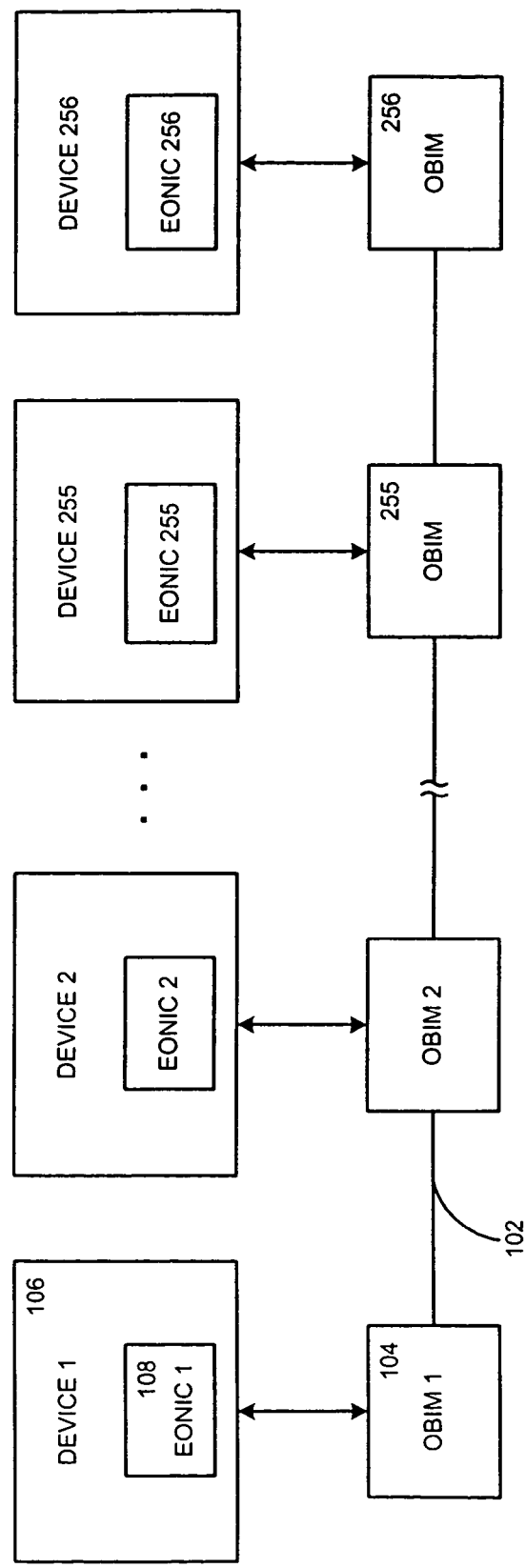
FIG. 1 is a diagram illustrating an exemplary optical network according to one embodiment of the present invention.

Referring now to the drawings in which like numerals indicate like elements throughout the several figures, FIG. 1 is a block diagram illustrating an exemplary optical transport system or network 100 according to one embodiment of the present invention. The optical network 100 can be designed to permit communication between different electrical devices having differing communication protocols and requirements. The optical network 100 includes an optical bus 102 and a series of optical bus interface modules (OBIMs) 104 coupled to the optical bus 102. The network can also include electronic devices 106, such as computer devices, coupled to the OBIM 104 via electro-optical network interfaces 108, such as an electro-optical network interface card (EONIC). In the embodiment shown in FIG. 1, the network 100 includes 256 electronic devices 106. Alternatively, more or less electronic devices 106 can be connected to the network 100.

The electronic devices 106 can be any suitable processor-based device, such as, a personal computer or a server device. Each device 106 is connected to a corresponding OBIM 104 through an EONIC 108, which can allow data to be transmitted on the network 100 according to a variety of suitable protocols such as, for example, Ethernet, FiberChannel, and Infiniband. Each EONIC 108 can be integral within each device 106 or, alternatively, each EONIC 108 can be external to the devices 106. With conventional optical networks utilizing protocols such as Ethernet, FiberChannel, or Infiniband, connecting a device, such as a computer, to an optical bus can require two interface cards and a switch for every device.

Each OBIM 104 can be an arrangement of passive fiber optic couplers, which can wavelength selectively route optical signals in and out of the optical bus 102 at each node, and can facilitate data transmission and reception over the optical bus 102. The OBIMs 104 used with the optical network 100 can be configured like the OBIMs disclosed in U.S. Pat. No. 5,901,260, which is hereby incorporated in its entirety by this reference.

The optical bus 102 can include one, two or a plurality of fiber optic lines and can be a bi-directional optical bus configured in a broken ring, such as disclosed in U.S. Pat. No. 5,898,801, which is hereby incorporated in its entirety by this reference. Alternatively, the optical bus 102 can be a closed loop, circulating optical bus, such as described with reference to FIG. 2 below.

Figure 2:
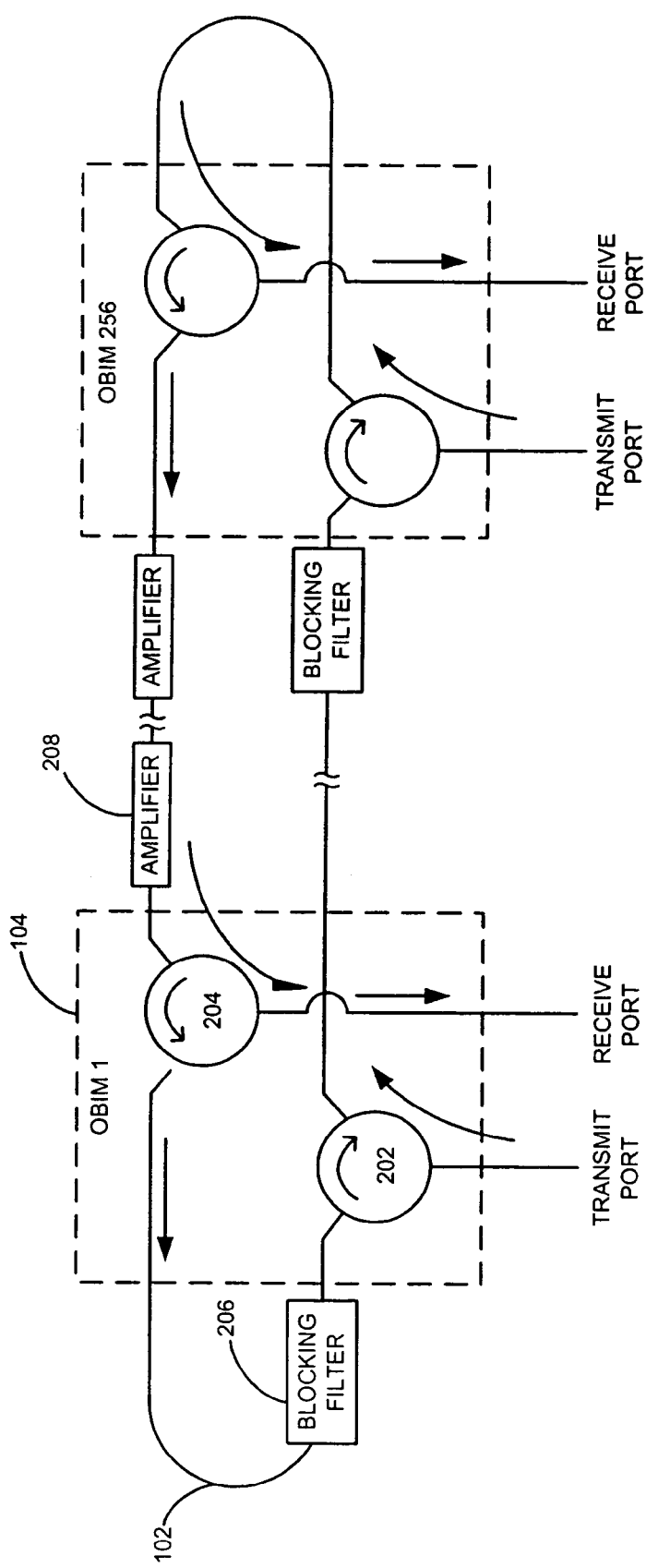
FIG. 2 is a diagram illustrating an exemplary circulating optical bus according to one embodiment of the present invention.

FIG. 2 is a diagram illustrating an exemplary closed loop, circulating optical bus 102 and OBIMs 104 according to one embodiment of the present invention. The OBIMs 104 used with this circulating optical bus can have two optical circulators, 202, 204. A first optical circulator 202 can transmit data to the bus 102 and a second optical circulator 204 can receive data from the bus 102. Each OBIM 104 can also include an associated stop filter 206 matched to the wavelength of the OBIM 104 to stop light from re-circulating through the OBIM 104 and zeroing out the light. As shown in FIG. 2, the bus 102 can also include an amplifier 208, such as an erbium-doped fiber amplifier (EDFA), if needed, to amplify and assist in the transmission of optical signals through the optical bus 102. In one embodiment, the light pump for the bus 102 is integral to the amplifier 208.

Figure 3:
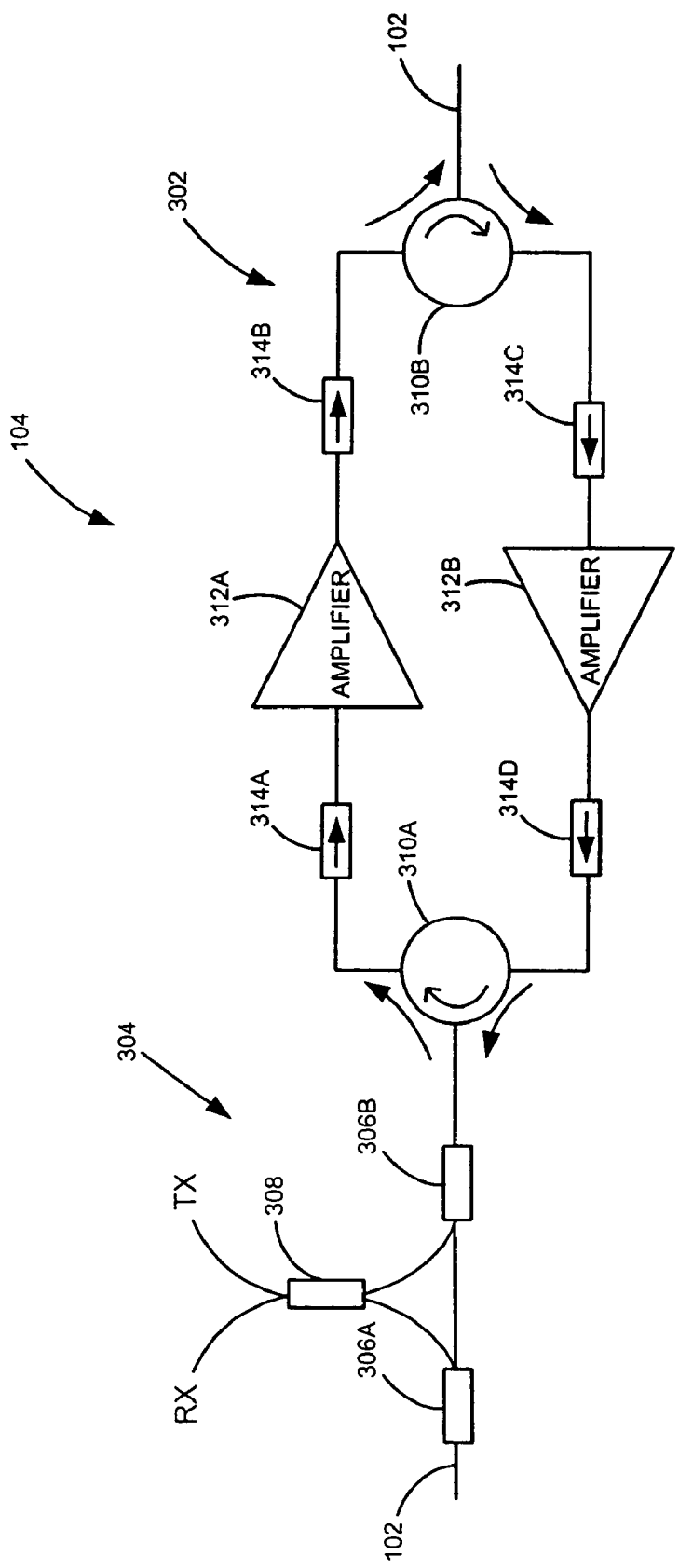
FIG. 3 is a diagram illustrating an exemplary OBIM according to one embodiment of the present invention.

FIG. 3 illustrates a diagram of an alternative version of an OBIM 104 according to one embodiment of the present invention. The OBIM 104 as shown in FIG. 3 includes an amplification circuit 302 to compensate for losses that occur in a coupling circuit 304. The coupling circuit 304 can input signals onto the bus 102, receive signals from the bus 102, and allow signals to travel through on the bus 102. The coupling circuit 304 can include two input/output couplers 306A, B, which can allow the input of signals onto the bus 102, the receipt of signals from the bus 102, and allow signals to travel through on the bus 102. In one embodiment, the input/output couplers 306A, B are 30/70 couplers. The coupling circuit 304 can also include a transmit/receive coupler 308 that can separate signals to and from the receive port RX and the transmit port TX of the OBIM 104. In one embodiment, the transmit/receive coupler 308 is a 50/50 coupler.

In the embodiment shown in FIG. 3, the optical bus 102 is a bidirectional bus and therefore the amplification circuit can have a pair of optical circulators 310A, B, which can control the flow of signals through the amplification circuit 302. The amplification circuit 302 can also include a pair of amplifiers 312A, B, such as EDFA or SOA, and optical isolators 314A-D.

FIG. 4 is a diagram illustrating an alternative embodiment of an OBIM according to one embodiment of the present invention. As shown in FIG. 4, the OBIM 104 contains a cascading of coupling circuits 402, 404 and 406 in order to create multiple branches on and off the optical bus 102 from each OBIM 104. Each coupling circuit 402, 404, and 406 can include three couplers—a transmit/receive coupler 414 and two input/output couplers 412A, B. The input/output couplers 412A, B can allow the input of signals onto the bus 102, can allow the receipt of signals from the bus 102, and can allow signals to travel through on the bus 102. The transmit/receive coupler 414 can separate signals to and from a receive port and a transmit port of the OBIM 104. In one embodiment, the input/output couplers 412A, B and the transmit/receive coupler 414 are 50/50 couplers. The OBIM 104 as shown in FIG. 4 also can include amplifiers 410A, B, such as bi-directional optical amplifiers, that can balance the optical signals on the through port. While the embodiment shown in FIG. 4 allows for three branches on and off the optical bus 102, more or less, coupling circuits can be packaged together in a single OBIM to create a number of branches on and off the optical bus 102.

FIG. 5 is a diagram illustrating an alternative embodiment of an OBIM according to one embodiment of the present invention. The OBIM 104 as shown in FIG. 5 allows for the balancing of signals in the OBIM 104. The optical bus 102 is generally balanced on the through port, but losses occur getting on and off the bus. With the OBIM 104 shown in FIG. 5, bidirectional optical amplifiers 502 A-B are positioned between couplers 504 A-B and couplers 504 B-C respectively to allow for reduction of losses to the signals coming on and getting off of the bus 102. Bi-directional optical amplifier 502 C can be used to balance the optical signals on the through port.

FIG. 6 is a diagram illustrating an alternative embodiment of an OBIM according to one embodiment of the present invention. The OBIM 104 as shown in FIG. 6 allows for the balancing of signals in the OBIM 104 similar to the OBIM illustrated in FIG. 5 and contains multiple coupling circuits 602, 604 in order to create multiple branches on and off the optical bus 102 from each OBIM 104. With each coupling circuit 602, 604, bi-directional optical amplifiers 606 A-B are positioned between couplers 608 A-B and couplers 608 B-C respectively to allow for reduction of losses coming on and getting off of the bus 102. Bi-directional optical amplifier 606 C can be used to balance the optical signals on the through port.

Figure 7:
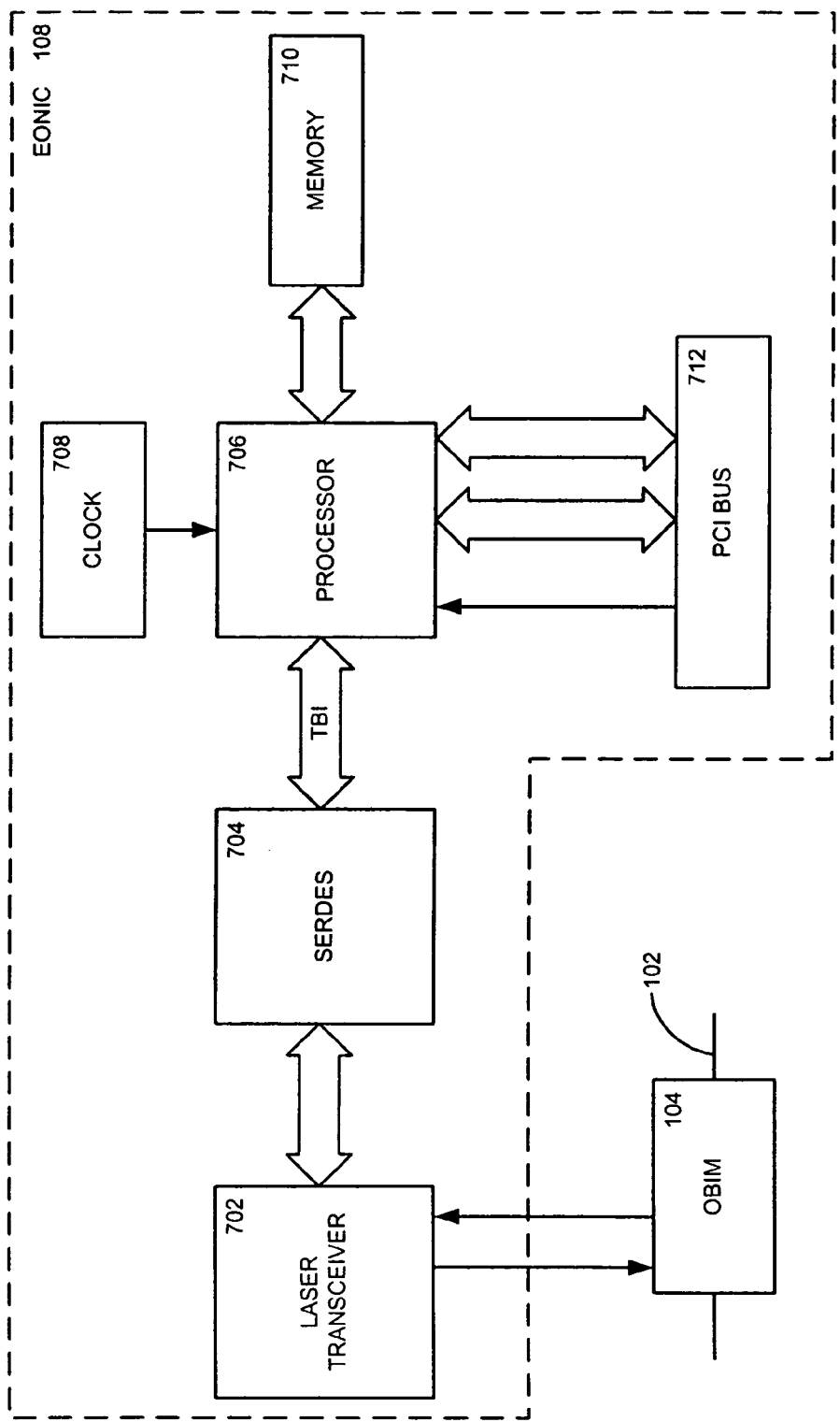
FIG. 7 is a diagram illustrating an exemplary electro-optical network interface according to one embodiment of the present invention.

FIG. 7 is a diagram illustrating an exemplary electro-optical network interface 108 according to one embodiment of the present invention. The electro-optical network interface 108 can be contained in a single structure or housing, such as a card, and can be referred to as an electro-optical network interface card (EONIC). The EONIC 108 can allow the optical bus 102 and the optical network 100 to transfer data according to a variety of suitable protocols such as, for example, Ethernet, FiberChannel, And Infiniband between the devices 106 on the network 100. Using Ethernet protocols as an example, data is transferred in packet form through the network 100 to devices 106 on the network 100. In one embodiment, large packets, such as 500 Mb packets, can be used. Using the EONIC 108, the electronic device 106 can tie directly from its bus to the optical bus 102 through the OBIM using the TCP/IP communication protocol. The EONIC 108 can operate in half duplex mode and remove the bottleneck from the translation from TCP to IP and the use of large packets of data can also help to alleviate this bottleneck.

With the EONIC 108 shown in FIG. 7, data signals in the form of light signals in packet form are received from the OBIM 104 by a laser transceiver 702. In one embodiment, the transceiver 702 receives one packet at a time. The transceiver 702 can utilize a narrowband laser compatible with an ITU grid, such as a DFB laser. The speed of the data signals coming into the transceiver 702 from the OBIM 104, in one embodiment, can be 1.2 gigabytes. After receipt of data signals, the laser transceiver 702 can convert the light signals to electrical signals. The electrical signals can then be passed to a serializer/deserializer (SERDES) 704. The SERDES 704 then passes the signals to the processor 706. The processor 706 can determine whether to process the electrical signals or ignore the signals based on the address contained in the packet. In one embodiment, the SERDES 704 can be a Gigabit S2060A from AMCC. If the SERDES 704 determines that the electrical signals are to be processed, the SERDES 704 can send the electrical signals to the processor 706. The electrical signals can be processed to prepare the electronic signals to be placed on a device bus 712 by the processor 706. In one embodiment, the processor 706 is a GigMax RTL8169 PCI Gigabit Driver from RealTek and can utilize an external 125 MHz clock 708. In one embodiment, the device bus 712 is a PCI bus.

The EONIC 108 can also contain a memory 710, such as an EEPROM, BOOTROM or FLASH, that is used if the device bus 712 is slower than the optical bus 102. For example, in one embodiment utilizing a PCI bus for the device bus 712, the PCI bus can transmit at 133 Mb per second and the optical bus can transmit at 1.2 Gb per second. In this embodiment, packets of data signals can be buffered in memory 710 and the electronic device 106 can be alerted by the processor 706 via the PCI bus 712 that data is available. The data can then be passed to the electronic device 106 via the PCI bus 712 at a rate controlled by the electronic device 106.

Similar to receiving data, the EONIC 108 can transmit data signals to the optical bus 102 received on the device bus 712. In this situation, data signals are received from the device 106 by the EONIC via the device bus 712. The processor 706 can process these signals, form them into packets and pass the packets to the SERDES 704. The SERDES 704 can pass the packets to the laser transceiver 702. The laser transceiver 702 can convert the data signals from electrical signals to optical signals and pass the optical signals to the OBIM 104.

Figure 8:
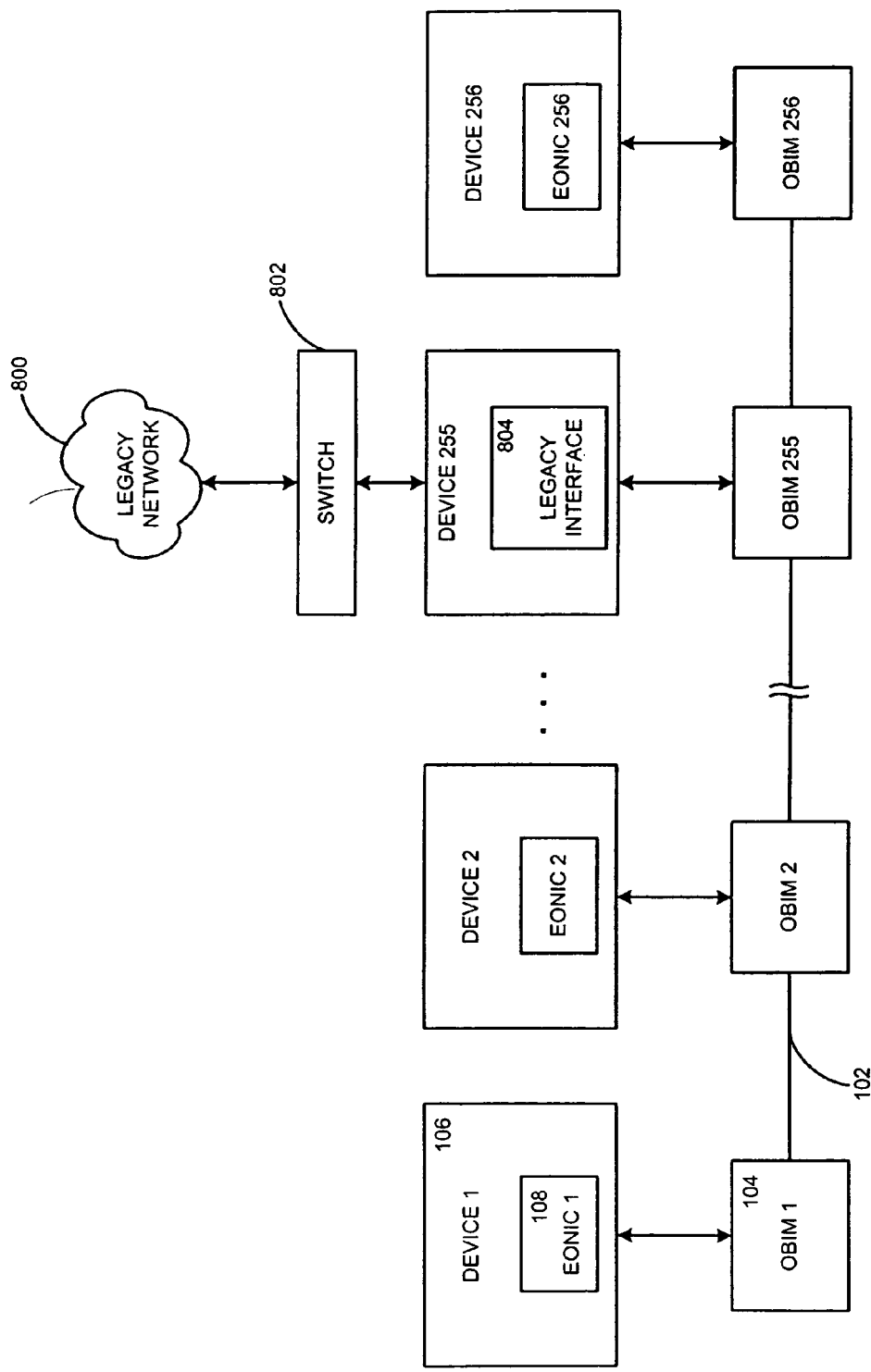
FIG. 8 is a diagram illustrating an optical network connected with a legacy network through a legacy network interface and switch according to one embodiment of the present invention.

FIG. 8 is a diagram illustrating an exemplary optical network connected with a legacy network according to one embodiment of the present invention. In the embodiment shown in FIG. 8, the optical network 100 is connected to a legacy network 800, such as a conventional Local Area Network (LAN). The optical network 100 can be connected to the legacy network by a legacy interface 804 associated with electronic device 255 and a switch 802. The legacy interface 804 can be contained in any suitable device on the network 100 or in multiple devices thereby connecting the network 100 with multiple legacy networks. The legacy interface 804 can allow communications between devices 106 on the optical network 100 and devices on the legacy network 800.

Figure 9:
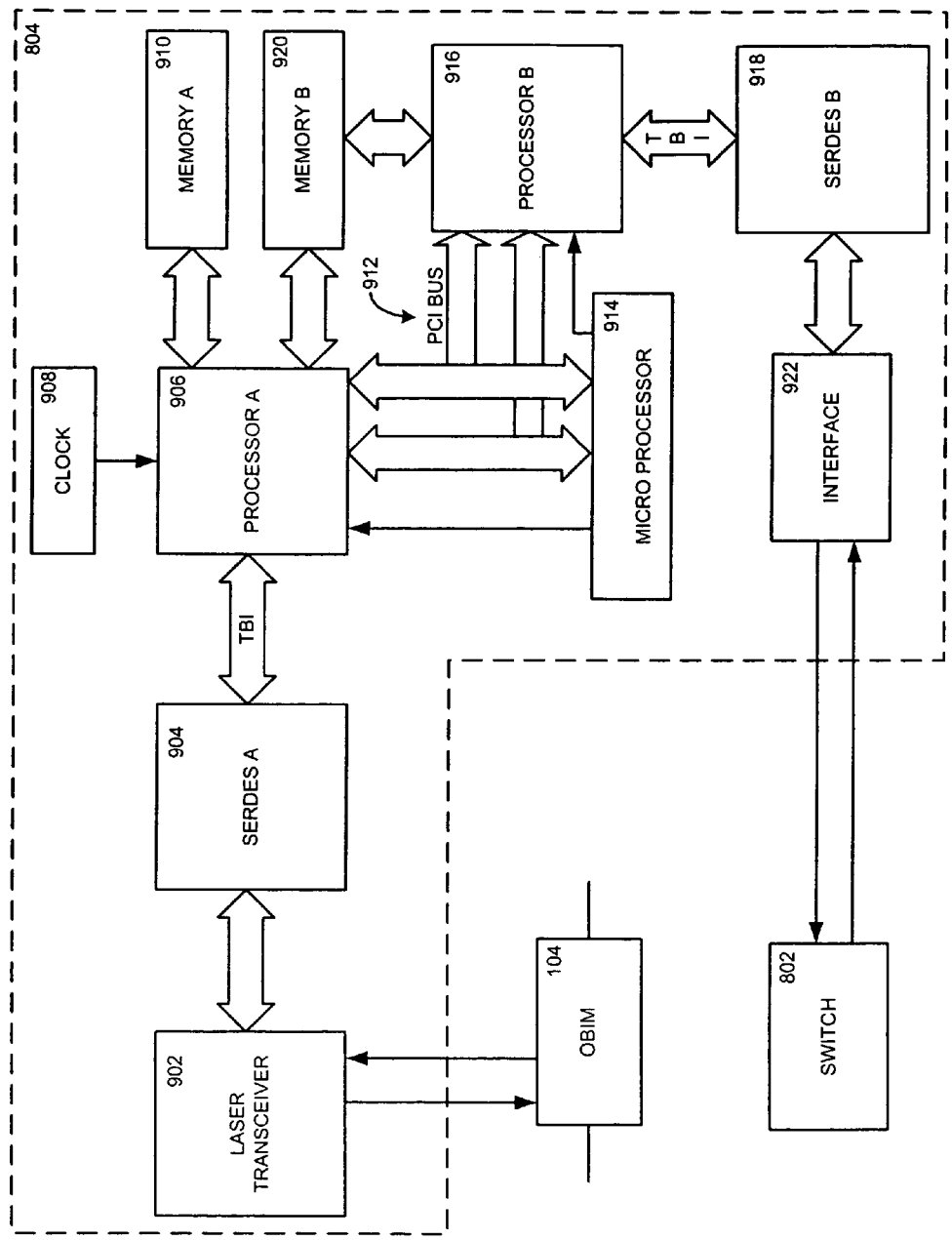
FIG. 9 is a diagram illustrating an exemplary legacy network interface according to one embodiment of the present invention.

FIG. 9 is a diagram illustrating an exemplary legacy network interface 804 according to one embodiment of the present invention. The legacy network interface 804 allows for the connection and distribution of data signals between the optical bus 102 and the legacy network 800, such as a conventional LAN, through a conventional switch 802.

In one embodiment, the legacy network interface 804 contains a duplication of the components contained in the EONIC 108 illustrated in FIG. 7. For example, data signals in the form of light signals in packet form are received from the OBIM 104 by a laser transceiver 902. The transceiver 902 can utilize a narrowband laser compatible with an ITU grid, such as a DFB laser. The speed of the data signals coming into the transceiver 902 from the OBIM 104, in one embodiment, can be 1.2 gigabytes. After receipt of data signals, the laser transceiver 902 can covert the light signals to electrical signals. The electrical signals can then be passed to a serializer/deserializer A (SERDES A) 904. The SERDES A 904 can pass the signals to a processor A 906. The processor A 906 can determine whether to process the electrical signals based on the address associated with the signals. In one embodiment, the SERDES A 904 can be a Gigabit S2060A from AMCC. If the SERDES A 904 determines that the electrical signals are to be processed, the SERDES A 904 can send the electrical signals to a processor A 906. The electrical signals can be processed to prepare the electronic signals to be placed on a bus 912 by the processor A 906. In one embodiment, the processor A 906 is a GigMax RTL8169 PCI Gigabit Driver from RealTek and can utilize an external 125 MHz clock 908. In one embodiment, the bus 912 is a PCI bus.

The interface 804 can also contain a memory A 910, such as an EEPROM, BOOTROM or FLASH, that can be used by processor A 906 to buffer the data signals, if processor A 906 determines that the data signals are addressed to the associated electronic device 255. The electronic device 255 can be alerted that data is available by the PCI bus 912. In this embodiment, packets of data signals can be buffered in memory A 910 until the associated electronic device 255 is ready to receive them and then transferred to the device 255 via the PCI bus 912.

The interface 804 can also include a microprocessor 914 connected to the bus 912. The microprocessor 914 can monitor data signals on the bus 912 and determine where to send the data signals. If the microprocessor 914 detects a packet of data signals received from the optical bus 102 for an address, such as a MAC address, that is not on network 100 and is on the legacy network 800, the microprocessor 914 can pass such packet to processor B 916. In one embodiment, the processor B 916 is a GigMax RTL8169 PCI Gigabit Driver from RealTek. The processor B 916 can then pass the packet addressed to the legacy network 800, to SERDES B 918. The SERDES B 918 can be connected to memory B 920, so that it can buffer the data packet if necessary. In order to send the packet to the legacy network 800, the SERDES B 918 can pass the packets to an interface 922, such as an interconnect laser or standard copper interface, which can pass the packets to the switch 802.

Similar to passing data packets to the legacy network 800, the interface 804 can receive data signals in packet form from the legacy network 800 and pass them to the optical network 100 through the OBIM 104. A packet from the legacy network 800 can be received by the interface 922 from the switch 802 and then be passed through the interface 804 to the laser transceiver 902. The laser transceiver 902 can convert the electrical signals of the packet to optical signals and send the packet of data signals to the OBIM 104.

Figure 10:
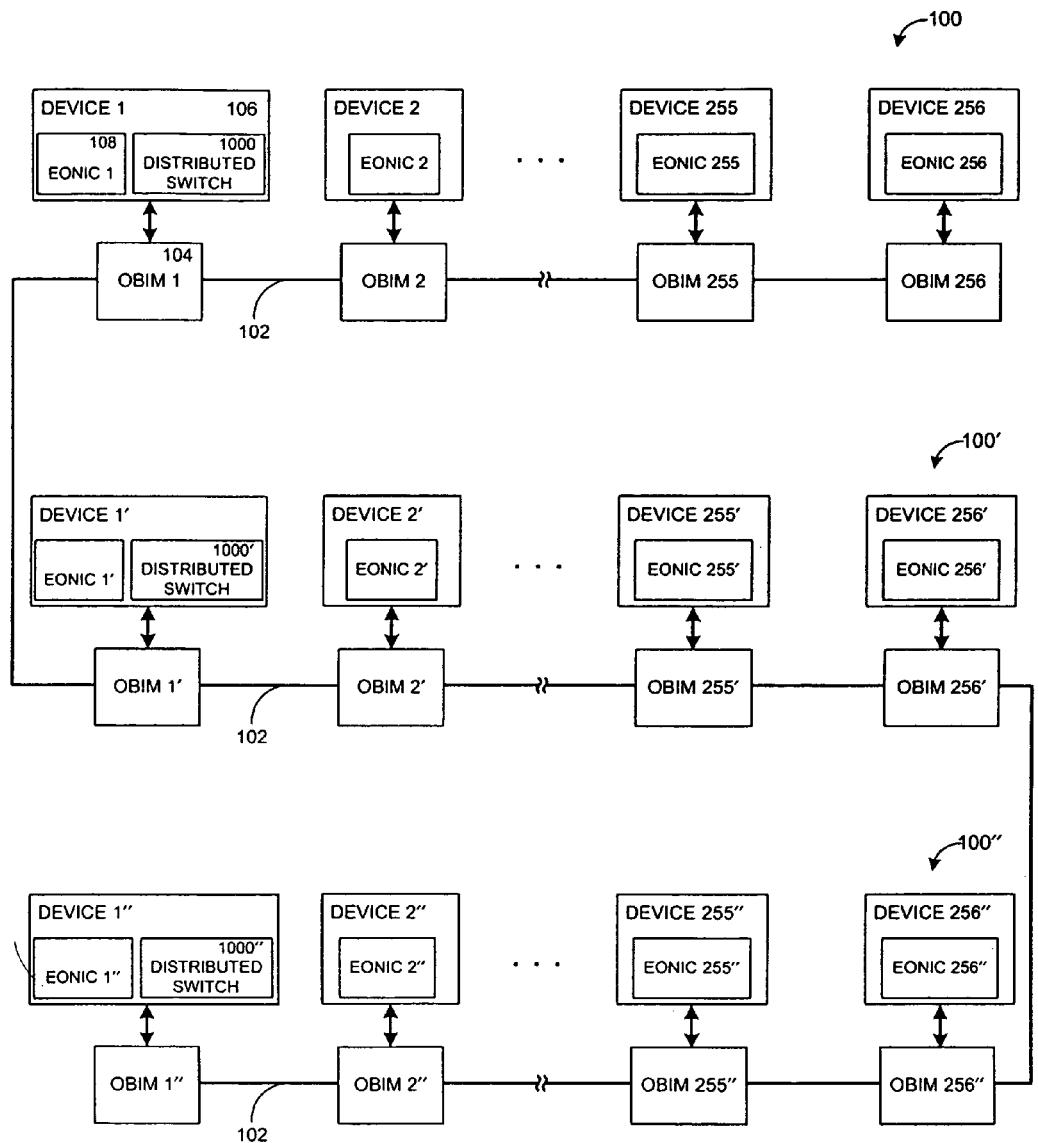
FIG. 10 is a diagram illustrating an exemplary distributed wavelength optical network according to one embodiment of the present invention.

FIG. 10 is a diagram illustrating distributed wavelength optical networks according to one embodiment of the present invention. There are three networks illustrated in FIG. 10—networks 100, 100', and 100". Similar to the network 100 illustrated in FIG. 1, the networks include OBIMs and devices connected to OBIMs via EONIC 108. The optical bus 102 connects each network. The networks 100, 100', and 100" can each operate on a separate wavelength of light, but can be connected via the same optical bus 102. For example, network 100 can be on wavelength A, network 100' can be on wavelength B and network 100" can be on wavelength C. In one embodiment, a distributed switch is included in one device in each network. Each distributed switch 1000, 1000' and 1000" monitors data signals in the form of packets from all input wavelengths and, for addresses associated with its respective network, outputs data signals in the form of packets addressed to devices in its network on its network's wavelength. For example, distributed switch 1000 monitors wavelengths A, B and C, and if data signals sent on wavelength B are addressed to a device in network 100, the distributed switch 1000 outputs the data signals on wavelength A so that they can be received by the appropriate device. Similarly, distributed switch 1000' monitors wavelengths A through C and outputs data signals addressed to network 100' on wavelength B and distributed switch 1000" monitors wavelengths A through C and outputs data signals addressed to a device on network 100" on wavelength C.

Figure 11:
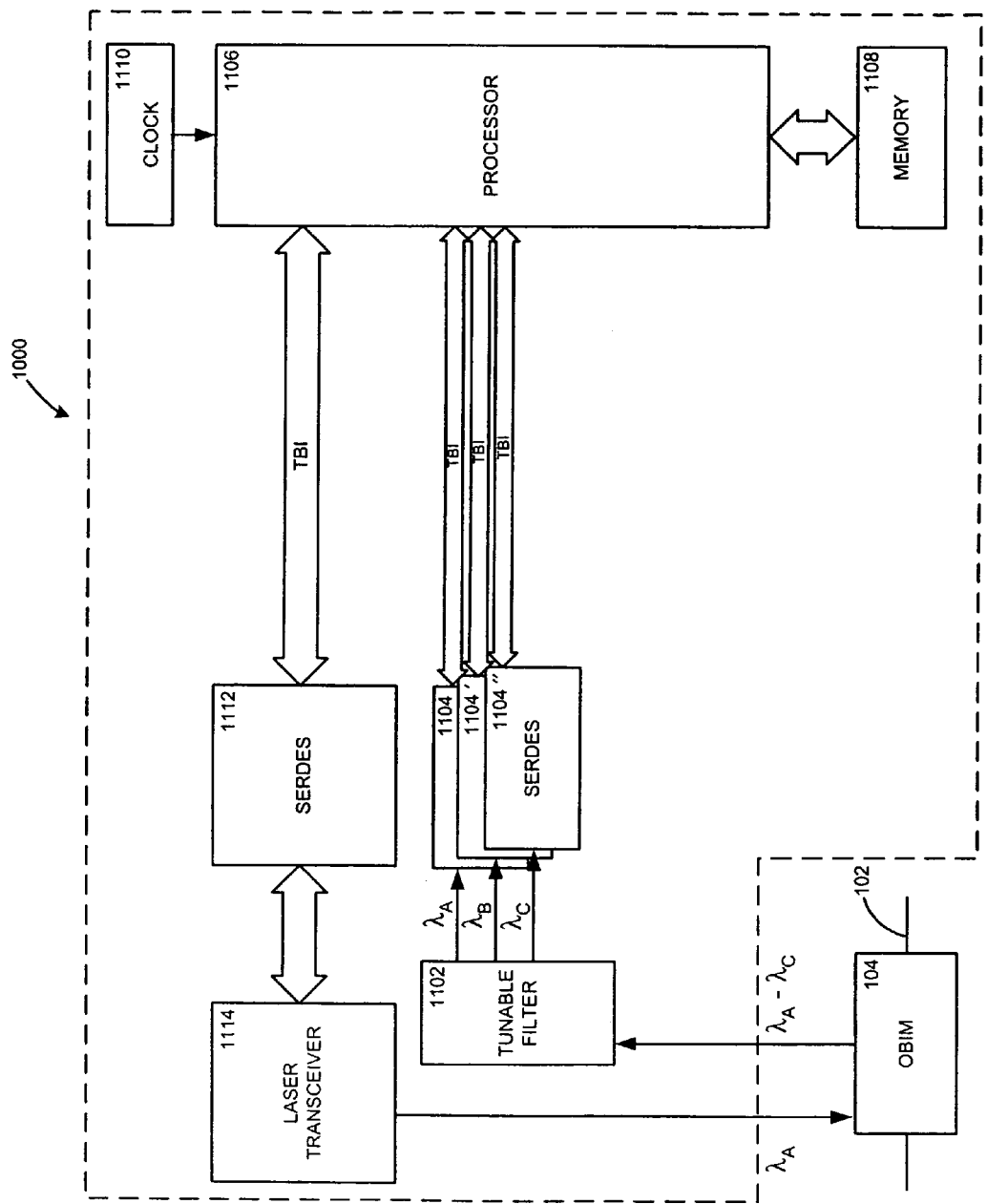
FIG. 11 is a diagram illustrating an exemplary distributed switch interface according to one embodiment of the present invention.

FIG. 11 is a diagram of an exemplary distributed switch according to one embodiment of the present invention. Data signals in the form of packets on wavelengths A through C are received by the distributed switch at a tunable filter 1102. The tunable filter can separate out each wavelength and pass it to a respective SERDES 1104, 1104', 1104". The SERDES can then pass the data signals to a processor 1106, such as an ASIC. The processor 1106 can determine from address information associated with the data signals which network the data signals pertain to. In this example, if the processor 1106 determines that the data signals relate to a device on network 100, the signals are sent to SERDES 1112 and then sent to a laser transceiver 1114. The laser transceiver 1114 sends the signals out to network 100 in wavelength A via OBIM 104. The processor can also have an associated clock, set to, for example, 125 MHz, and can also have an associated memory 1118, such as, EEPROM, BOOTROM, or FLASH. The memory 1108 can be used to buffer received data signals. The distributed switch 1000 can monitor any number of wavelengths.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A system, comprising:
an optical bus transmitting data signals in at least a first wavelength and a second wavelength; and
at least a first network and a second network,
wherein the first network comprises:
a plurality of first optical bus interface modules connected to the optical bus, wherein each first optical bus interface module inputs data signals on the optical bus and outputs data signals from the optical bus; a plurality of first electronic devices; a plurality of first electro-optical network interfaces, wherein each first electro-optical network interface is associated with a single first electronic device and is contained in a single structure, wherein each first electro-optical interface comprises a laser transceiver for communicating data signals on the first wavelength to and from an associated first optical bus interface module, a serializer/deserializer for communicating data signals to and from the laser transceiver and a processor for communicating data signals to and from the serializer/deserializer and for passing the data signals to and from the first associated electronic device according to at least one protocol;
a first distributed switch receiving data signals on the second wavelength addressed to the first electronic devices and converting the data signals to the first wavelength and outputting the data signals to the optical bus;
wherein the second network comprises:
a plurality of second optical bus interface modules connected to the optical bus, wherein each second optical bus interface module inputs data signals on the optical bus and outputs data signals from the optical bus;
a plurality of second electronic devices;
a plurality of second electro-optical network interfaces, wherein each second electro-optical network interface is associated with a single second electronic device and is contained in a single structure, wherein each second electro-optical interface comprises a laser transceiver for communicating data signals on the second wavelength from an associated second optical bus interface module, a serializer/deserializer for communicating data signals to and from the laser transceiver and a processor for communicating data signals to and from the serializer/deserializer and for passing the data signals to and from the second associated electronic device according to at least one protocol; and
a second distributed switch receiving data signals on the first wavelength addressed to the second electronic devices and converting the data signals to the second wavelength and outputting the data signals to the optical bus.

2. The system of claim 1, wherein the protocol comprises Ethernet protocols.

3. The system of clam 1, wherein the protocol comprises FiberChannel protocols.

4. The system of claim 1, wherein the protocol comprises Infiniband protocols.

5. The system of claim 1, wherein the data signals are arranged in large packets.

* * * * *

UNITED STATES PATENT AND TRADEMARK OFFICE
CERTIFICATE OF CORRECTION

PATENT NO. : 7,570,887 B2  Page 1 of 1
APPLICATION NO. : 10/493855
DATED : August 4, 2009
INVENTOR(S) : Rohrer et al.

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 760 days.

Delete the phrase "by 760 days" and insert -- by 1429 days --

Signed and Sealed this

Twentieth Day of July, 2010

David J. Kappos
*Director of the United States Patent and Trademark Office*